Sept. 4, 1962    J. G. BROWN    3,052,586
METHOD AND APPARATUS FOR THE MANUFACTURE
OF PHONOGRAPH RECORDS
Filed Oct. 11, 1954    2 Sheets-Sheet 1

INVENTOR.
J. G. BROWN
BY
ATT'Y.

Sept. 4, 1962 J. G. BROWN 3,052,586
METHOD AND APPARATUS FOR THE MANUFACTURE
OF PHONOGRAPH RECORDS
Filed Oct. 11, 1954 2 Sheets-Sheet 2

INVENTOR.
J. G. BROWN
BY
ATT'Y.

United States Patent Office 3,052,586
Patented Sept. 4, 1962

3,052,586
METHOD AND APPARATUS FOR THE MANUFACTURE OF PHONOGRAPH RECORDS
Jack G. Brown, 1213 Daniels Ave., Los Angeles, Calif.
Filed Oct. 11, 1954, Ser. No. 461,538
4 Claims. (Cl. 156—209)

This invention relates to the art of making sound records by the impression of sound grooves upon plastic material. Phonograph records are generally made by molding a plastic composition under heat and pressure in a press in contact with a matrix which reproduces the grooves formed in an original or master sound record. This procedure involves individual molding using a suitable molding operation and requires the utilization of substantial quantities of molding composition as well as considerable manual labor, a large number of presses, and substantial curing time for each impression.

In accordance with the present invention I have devised a method and apparatus for the manufacture of sound records of the disc type utilizing light gauge, inexpensive plastic film and which is also substantially automatic to the extent that hand labor and individual attention to each pressing is minimized or eliminated. In addition, I have developed novel laminated records produced by utilizing the aforesaid methods and apparatus.

In accordance with the present invention plastic sheet material of relatively light gauge capable of receiving and retaining impressions imparted under elevated temperature and pressure, is fed step by step between heated platens of a press, preferably of the hydraulic variety. Mounted upon the platens are record matrices or stampers formed by duplication from master records in a manner known to the art. The film is supplied in rolls and is drawn between the platens in an intermittent manner to permit successive impressions to be made upon the film. The impressed film is rewound in rolls for further use or assembly to form the final product. One aspect of the present invention involves the feeding of two strips of film between an opposed pair of platens simultaneously in order to form impressions upon opposite surfaces of the film simultaneously. At the same time, each strip of film serves to cushion the other during the impression portion of the cycle as will be explained below.

This invention is illustrated by way of example, in the accompanying drawings, wherein.

Figure 1:
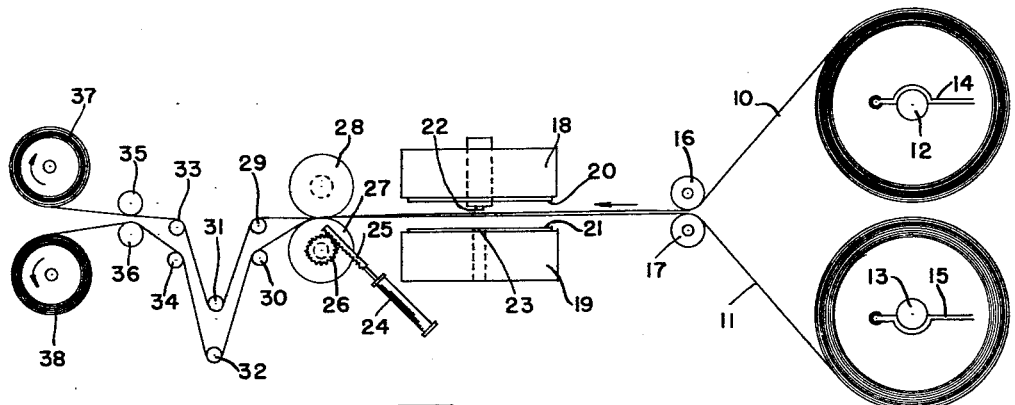
FIGURE 1 is a view in side elevation of an arrangement for performing the process of the invention.

Referring to FIGURE 1, plastic material in the form of sheets or webs 10 and 11 of suitable width is unwound from rolls supported on shafts 12 and 13. In order to control tension during unwinding, suitable braking means 14 and 15 may be provided. The plastic sheets pass under roll 16 and over roll 17 and are guided between platens 18 and 19 of a hydraulic press. The platens are provided with record matrices or stampers 20 and 21, and are heated to a desired temperature either by steam or electric heating units (not shown). Attached to the upper platen is a center punch 22 which cooperates with an opening 23 to punch a center hole in the record impression to permit positioning over the centerpart of a turntable after the record has been completed. Both webs are drawn through the apparatus by rolls 27 and 28, which are in engagement and between which the webs pass. Roll 27 is driven in an intermittent manner by a gear and ratchet mechanism powered by an air cylinder 24 or by any other suitable intermittent driving means known to the art. The sheets or webs pass over guide rolls 29 and 30, under dancer rolls 31 and 32, and pairs of guide rolls 33, 34 and 35, 36, being rewound in rolls 37 and 38 supported on shafts operated by driving means geared or otherwise synchronized with driven roll 27 so that the impressed material is obtained in a fairly uniformly wound roll. Winding may utilize any other desirable means for obtaining the roll.

In the operation of the process as described above, the plastic sheet may be cellulose acetate, polyvinyl chloride, or other plastic sheet susceptible of plastic deformation at elevated temperatures and pressures. The sheet may be of suitable gauge, preferably in the range of one to five mils in thickness. The platens of the press are operated at a temperature sufficient to permanently impress the material under pressure without at the same time affecting the material itself. In general, temperatures in the range of about 140° F. to 200° F. at pressures of 800 to 1400 pounds per square inch are sufficient. It has also been found that in applicant's process short cycles may be utilized to obtain record impressions with good fidelity. A suitable impression is obtained with a dwell time between the platens of from one to five seconds. This permits the sheet material to be fed intermittently between the platens while they are in raised or spaced position, the web is then stopped and the platens close together forming the impression upon opposed sides of the sheets at the desired time, temperature and pressure, the platens are moved apart, and the webs move forward another increment of distance for another impression. The entire cycle of feeding, pressing and winding thus becomes susceptible to automatic operation and control.

Applicant has discovered that two sheets or webs may be simultaneously impressed with record grooves between a pair of cooperating platens, each of which carries a record matrix or stamper by feeding the webs between the platens while in a superimposed condition. Each sheet or web acts as a cushioning agent for the other, thus permitting the same or different material to be impressed upon the surfaces of the sheets in contact with the stampers.

Figure 2:
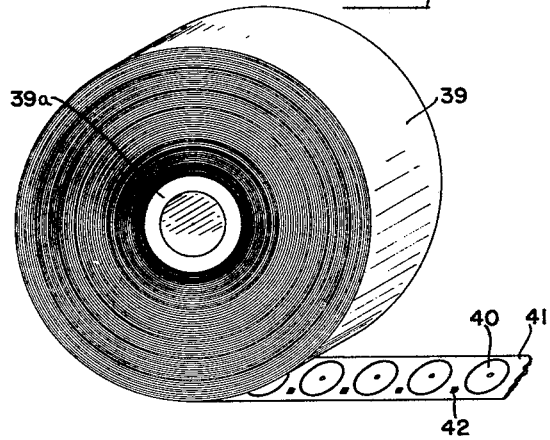
FIGURE 2 is a view in perspective of a roll of finished product.

A finished roll of record impressions produced in the apparatus of FIGURE 1 is illustrated in FIGURE 2. The sheet or strip of record material 41 forming roll 39 is wound upon a core 39a. The sheet includes a series of record impressions 40. Where the roll is to be processed in electronically controlled equipment, eye targets 42 may be printed upon the sheet at spaced intervals, preferably during, or immediately following the pressing stage of the cycle.

Figure 4:
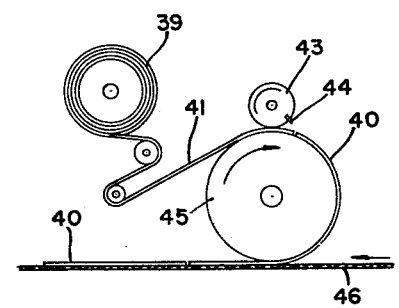
FIGURE 4 is a view in side elevation illustrating another arrangement for assembling a laminated record.

As illustrated in FIGURE 4, the impressed sheet material may be cut into individual members and laminated to paper or cardboard. Sheet material 41 is unwound from roll 39 and passes around rotary drum 45. The drum may be perforated and the material is held against the drum by suction. Individual pressed areas 40 are cut off by knife 44 on rotary member 43 and are deposited upon a travelling sheet or web of cardboard 46 having an adhesive coated surface. The cardboard may then be cut out into individual records, or 46 may be in the form of a box blank or cut-out box member so that the laminated record may form one side of a paper box or carton to be cut out and used by a purchaser of the box and its contents. The feeding and cutting operation may be controlled electronically by utilizing targets printed on the record strip.

Figure 3:
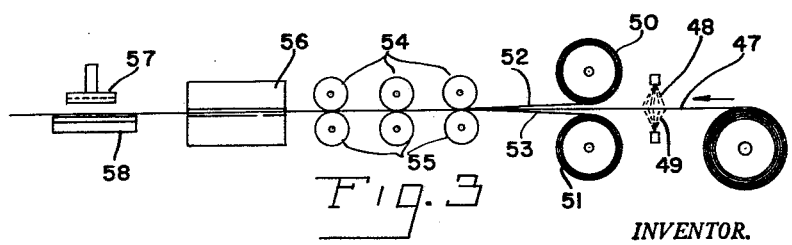
FIGURE 3 is a view in side elevation illustrating one manner of assembling a laminated phonograph record.
Figure 5:
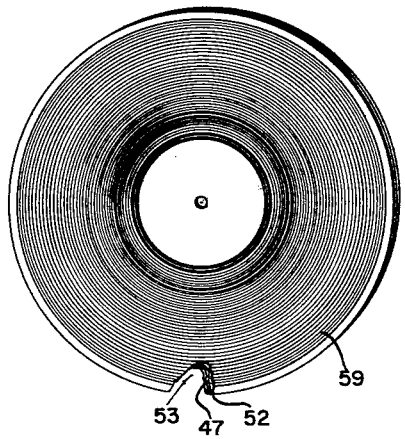
FIGURE 5 is a view partly in cross section illustrating one product of the invention.

FIGURE 3 illustrates a modified form of the invention in which a record is produced by laminating a paper or cardboard or other core of sheet material between two sheets of record impressions as formed in FIGURE 1. Sheet paper or board 47 is fed from a roll and coated on both surfaces with an adhesive using spray means 48 and 49, or by using a roller coating device, or the like. The adhesive coated sheet is then fed between two sheets 52 and 53 of material having spaced record impressions thereon, unrolled from rolls 50 and 51. The assembled layers then pass between a set of laminating rolls 54 and 55 which press the layers together and thence through a heater 56 for the purpose of drying or setting the adhesive. The adhesive used may be any well-known material used for adhering sheet plastic to the core material. Suitable adhesives for paper are solutions of cellulose acetate, latex emulsions, polyvinyl chloride dispersions, etc. From the dryer the laminated strip passes over cutting table 58 and the individual records are disced out by a circular knife 57. The product obtained is illustrated in FIGURE 5, which shows core 47, top and bottom record layers 55 and 53, the exposed top surface showing the record groove 59 formed therein.

Figure 6:
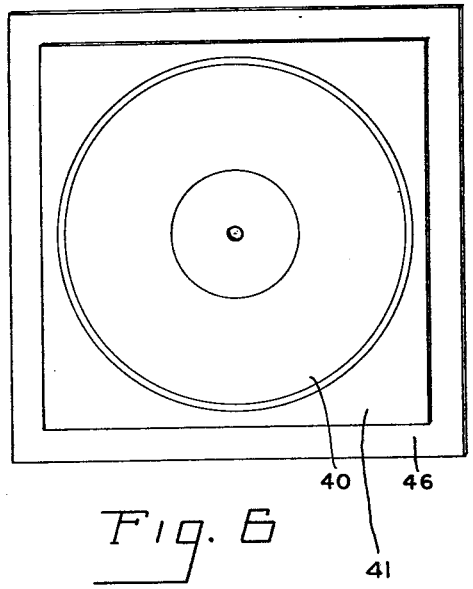
FIGURE 6 is a plan view illustrating still another form of the product obtained.

The type of record obtained in accordance with the procedure illustrated in FIGURE 4 is shown in FIGURE 6. This is in the form of a rectangular card 46 to which is laminated a rectangularly cut plastic sheet 41 bearing record impression 40.

Figure 7:
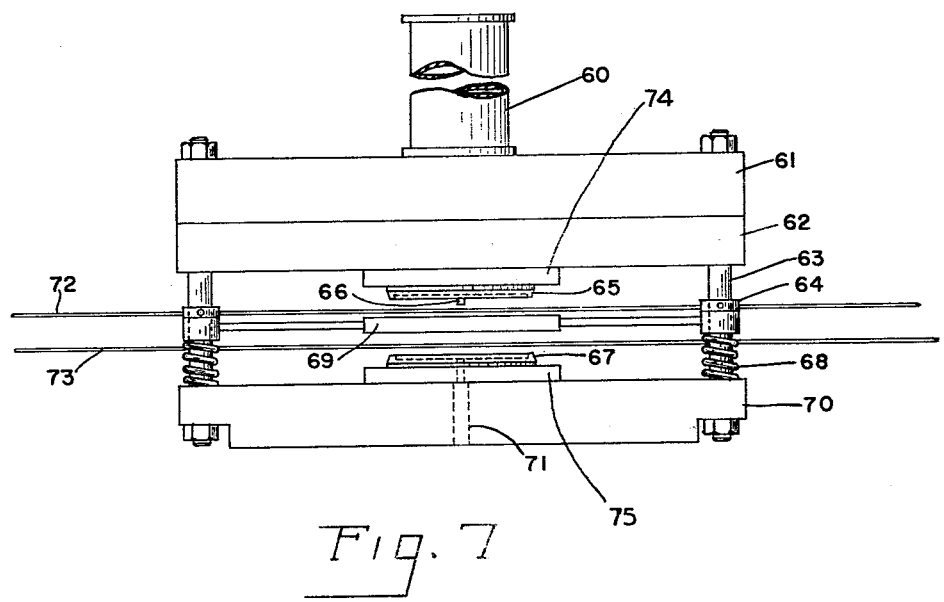
FIGURE 7 is a view in side elevation of a modified form of apparatus utilized in forming the record impressions.

FIGURE 7 illustrates a modified form of the apparatus shown in FIGURE 1, in which a stripper plate member is interposed between the two sheets or webs in the press. In this arrangement a hydraulic press is illustrated in simplified form since any well-known type of press providing sufficient pressure may be utilized. Upper platen 62 is mounted upon base plate 61. A stripper plate 69 is interposed between the strips of film 72 and 73 and is so positioned that on each impression of the platens, the stripper plate will back up the film at the same time serving to provide additional cushioning. This will also serve to eliminate any tendency of the film to stick together which may occasionally occur otherwise. The stripper plate may be coated on each side with a thin layer of rubber or resilient plastic to provide additional cushioning. The press illustrated in FIGURE 7 may be of any conventional type designed to operate the platens at the desired pressure. The press is operated by a ram member 60. The record stampers are shown at 65 and 67, with 66 being a punch for removing the center hole of the record when the downward movement of the platen causes it to pass through both films entering opening 71. The stripper plate is attached at opposite sides to sleeves 64 slidably mounted on posts 63 and cushioned by springs 68. The posts may be those on which the platens are supported or may be separate therefrom. In general, it is desirable for the stripper plate to be mounted in such a manner that it will "float" between the two strips and act as an additional cushioning means when the opposed platens are engaged.

I claim:

1. A method for the manufacture of phonograph records which comprises positioning embossing members bearing the record grooves to be impressed face to face upon opposed platens, transporting a pair of superimposed elongated relatively thin sheets of thermoplastic material between said platens and embossing members while they are in spaced apart position with a separable cushioning member interposed between said sheets, bringing said sheets to rest therebetween while still in said superimposed position, bringing said platens together and subjecting said sheets to heat and pressure between said embossing members with said cushioning member engages between said sheets for a period of time and at a temperature and pressure sufficient to impress and emboss said record grooves upon the outer surfaces of said sheets without otherwise affecting them, said sheets thereby serving to cushion each other to supplement the cushioning effect of said cushioning member while they are under pressure between said platens, releasing said pressure, separating said sheets from said cushioning member and resuming the spaced apart position of said platens and embossing members, and successively repeating the transportation of the superimposed sheets and the impression of said record grooves upon successive spaced portions of said sheets with the same cushioning member positioned therebetween, in order to obtain a pair of elongated sheets having successive spaced embossed record groove bearing areas formed therein, removing the record groove bearing areas from said sheet, and affixing such areas to backing members to form self-sustaining phonograph records.

2. A method for the manufacture of phonograph records which comprises positioning embossing members bearing the record grooves to be impressed face to face upon opposed platens, transporting a pair of superimposed elongated relatively thin sheets of thermoplastic material between said platens and embossing members while they are in spaced apart position, bringing said sheets to rest therebetween while still in said superimposed position, bringing said platens together and subjecting said sheets while superimposed and in contact with each other to heat and pressure between said embossing members for a period of time at a temperature and pressure sufficient to impress and emboss said record grooves upon the outer surfaces of said sheet without otherwise affecting them, the time, temperature and pressure utilized for the embossing being insufficient to cause cohesion of said superimposed sheets, said sheets thereby serving to cushion each other while they are under pressure between said platens, reelasing said pressure and resuming the spaced apart position of said platens and embossing members, and successively repeating the transportation of the superimposed sheets and the impression of said record grooves upon successive spaced portions of said sheet in order to obtain a pair of elongated sheets having successive spaced embossed record groove bearing areas formed therein, removing the record groove bearing areas from each sheet and affixing such areas to backing members to form self-sustaining phonograph records.

3. Apparatus for the manufacture of phonograph records from relatively thin sheets of thermoplastic material which comprises a press having spaced platens, means for heating said platens, an embossing member affixed to each platen comprising a matrix of the sound track to be embossed on said film, means for intermittently conveying a pair of separate superimposed sheets of such plastic material between platens, a cushioning plate member maintained in position between said platens in such a manner that one of said sheets passes between one surface of said plate and one of said embossing members and the other sheet passes between the other surface of said plate and the other of said embossing members, means for periodically stopping the movement of the plastic material and causing said platens to come together to engage the outer surfaces of the said sheet material between said embossing members under heat and pressure during the period of rest, said cushioning plate member remaining interposed between said sheets of plastic material and between the platens whereby the sheets are cushioned while under pressure, thereby embossing said sound tracks in a spaced manner upon said sheet of material, means for separating said platens, and means for separately removing said embossed sheets from between said platens at the conclusion of each periodic pressure embossing operation, said cushioning plate member remaining interposed between successive impressions whereby said successive impressions are cushioned while under pressure by means of the same plate member.

4. A method according to claim 2 wherein the sheet material is in the form of light gauge thermoplastic film selected from the class consisting of cellulose acetate and polyvinyl chloride having a thickness of from one to five mils, and wherein the material is subjected to a temperature of about 140 to 200° F. at a pressure of about 800 to 1400 p.s.i. for a period of about one to five seconds during the impression of said record grooves.

References Cited in the file of this patent

UNITED STATES PATENTS

| | | |
|---|---|---|
| 1,328,371 | Emerson et al. | Jan. 20, 1920 |
| 1,546,573 | Edison | July 21, 1925 |
| 1,996,057 | Buckle | Apr. 2, 1935 |
| 1,997,398 | Whyte | Apr. 9, 1935 |
| 2,511,708 | Hammond | June 13, 1950 |
| 2,616,125 | Colombo | Nov. 4, 1952 |
| 2,693,221 | Lyijynen | Nov. 2, 1954 |

FOREIGN PATENTS

| | | |
|---|---|---|
| 358,601 | Great Britain | Oct. 15, 1931 |